July 15, 1941.  J. CASALI  2,248,957
COOKING UTENSIL
Filed May 25, 1940
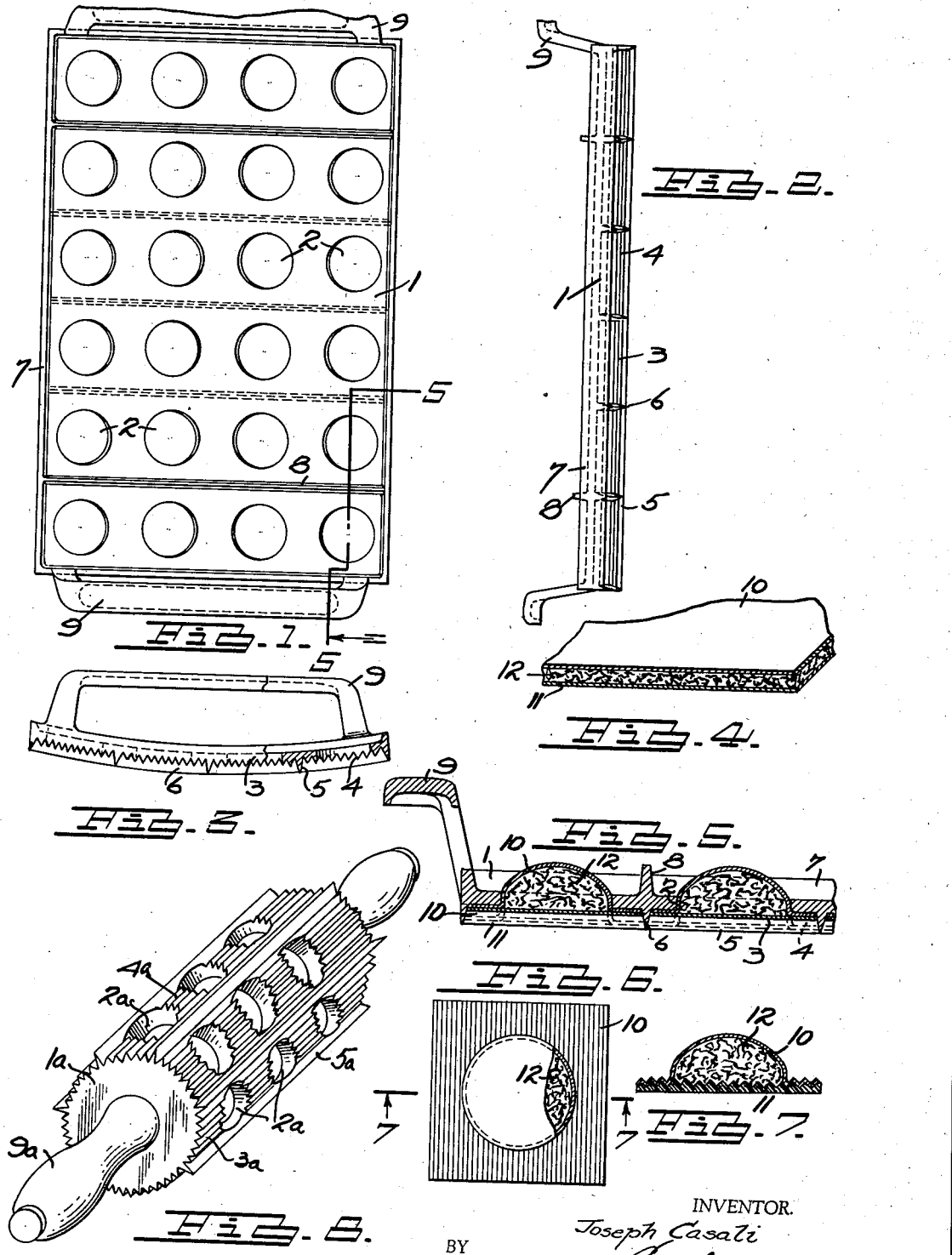
INVENTOR.
Joseph Casali
BY Gerald F Baldwin
his Attorney.

Patented July 15, 1941

2,248,957

UNITED STATES PATENT OFFICE 2,248,957

COOKING UTENSIL

Joseph Casali, Detroit, Mich.

Application May 25, 1940, Serial No. 337,327

2 Claims. (Cl. 107—47)

This invention relates to improvements in cooking utensils, and refers primarily to cooking utensils for making edible units, such as ravioli or pates consisting of two layers of paste or dough between which a filling is provided, filled cookies and the like.

When making such edible units considerable work is entailed in encasing the filling between the upper and lower layers of paste or dough and sealing the edges of the latter so that, during the subsequent cooking operation, the filling does not leak out; moreover it is a common practice to make such edible units singly so that it is a tedious and lengthy operation.

It is an object of the invention to provide a cooking utensil with which relatively large upper and lower layers of paste or dough (in the form of sheets) between which a filling has been spread, may be so handled that a plurality of such edible units may be formed, and their marginal portions sealed, in a single operation. This is accomplished by providing a cooking utensil consisting of a curved member having spaced apertures formed therein so that when the said member is pressed down upon the upper layer of paste or dough almost all the filling is squeezed beneath the portions of the upper layer which register with the apertures thereby forcing those upper layer portions upwardly into the apertures to form raised central portions of the edible units; at the same time the imperforate portions of the curved member force the other portions of the upper layer down into intimate contact with the lower layer thereby sealing the marginal portions of the edible units to prevent leakage during subsequent cooking.

Another object of the invention is to provide such a cooking utensil wherein the surface of the curved member is serrated not only to impart a pleasing appearance to the marginal portions of the edible units, but also to force the upper layer of the paste or dough around the marginal portions of the units into more intimate and binding contact with the lower layer to better resist leakage while cooking.

A further object of the invention, in its preferred form, is to provide such a cooking utensil whereby the edible units are separated from one another simultaneously with their formation.

Having thus briefly and broadly stated some of the objects and advantages of the invention I will now proceed to describe my invention more fully with the aid of the accompanying drawing, in which:

Figure 1 illustrates a plan view of the invention,

Figure 2 is a side elevation thereof, and

Figure 3 shows an end view partly in section.

Figure 4 is a sheet of the edible material consisting of an upper and a lower layer with the filling between prior to applying my utensil thereto.

Figure 5 is a partial longitudinal section of the invention with a part of the edible sheet formed into shape thereby.

Figure 6 is a plan view of a single edible unit formed by my utensil.

Figure 7 is a section on the line 7—7 of Figure 6.

Figure 8 is a perspective view showing a modified form of the invention.

Referring to Figures 1 to 7 of the drawing, I designates a curved member or plate having spaced apertures 2 formed in its outwardly bowed working surface 3 which is preferably longitudinally serrated as shown at 4. The apertures 2 are usually arranged in rows extending both longitudinally and transversely of the member I. Spaced equally between adjacent longitudinal and transverse rows of the apertures 2 are cutting ribs 5 and 6 respectively which are integral with the member I and project outwardly somewhat beyond the serrations 4.

The reverse side of the member I is reinforced by an annular bead 7 and ribs 8, and is provided at opposite sides with transversely disposed handles 9 the tops of which are preferably flat to facilitate the exertion of pressure thereon when the member I is being rocked on its outwardly bowed working surface 3.

The edible material to be treated with the cooking utensil consists of an upper and a lower layer 10 and 11, of paste or dough, between which a filling 12 has been spread. The working surface 3 of the member I is placed upon the upper layer 10, downward pressure is applied through the handles 9, and the member is rocked upon the said layer. Then the portions of the latter positioned beneath the apertures 2 are forced upward thereinto by the filling 12 which is squeezed from beneath the imperforate portions of the member I. Thus raised central portions B of the edible units A are formed, the marginal portions of the latter are sealed by the serrations 4 which force the portions of the upper layer 10 which they contact into intimate and binding contact with opposed portions of the lower layer 11, and the cutting ribs 5 and 6 sever the edible units A, one of which is shown in Figures 6 and 7, from one another.

In the modification shown in Figure 8, the curved member 1a is circular in cross section; the apertures 2a arranged in longitudinal rows are radially disposed through the working surface 3a in which longitudinal serrations 4a are formed. Cutting ribs 5a are also provided longitudinally of the member 1a, and the latter is provided at opposite extremities with handles 9a. The operation is the same as that of the member 1 already described except that in this case the member is rotated over the upper layer of paste or dough instead of being rocked thereon. Further in the modification under discussion I prefer to dispense with the transverse cutting ribs and sever the edible units transversely by a separate and subsequent cutting operation.

While in the foregoing two embodiments of the invention have been described and shown, it is understood that further alterations and modifications may be made thereto provided the said alterations and modifications fall within the scope of the appended claims.

What I claim is:

1. A cooking utensil comprising a plate having a downwardly curved serrated surface on its underside, handles integral with said plate adjacent its extremities and projecting upwardly therefrom, said plate having a plurality of apertures formed through its working surface whereby when it is pressed down and rocked upon edible material consisting of two layers of paste or dough having a filling therebetween the portions of the layers beneath the imperforate portions of the member are pressed into contact with one another and the filling is squeezed between the portions of the layers which register with said apertures and cutting ribs integral with said plate projecting downward from its working surface beyond said serrations.

2. A cooking utensil comprising a plate having its underside curved and adapted to be pressed down on and rocked upon edible material consisting of layers of paste or dough having filling therebetween, said plate having spaced apertures formed therethrough into which portions of the upper layer of paste or dough are adapted to be forced by portions of the filling moving from beneath unapertured portions of the plate, ribs integral with the plate on its upper side, said ribs extending across the plate between the apertures, and handles integral with the plate and projecting upwardly therefrom.

JOSEPH CASALI.